United States Patent Office 2,819,944
Patented Jan. 14, 1958

2,819,944

PURIFICATION PROCESS

Howard L. Wibbles, Joliet, Ill., and Earl I. Miller, St. Louis, Mo., assignors to the United States of America as represented by the United States Atomic Energy Commission No Drawing. Application January 26, 1954
Serial No. 406,381

6 Claims. (Cl. 23—14.5)

This invention deals with the separation of uranium and molybdenum compounds, and in particular with their separation from ether solutions containing the molybdenum in the form of heteropoly acids, such as silicomolybdic and phosphomolybdic acids.

One of the main natural sources of uranium is pitchblende in which the uranium content usually ranges from 50 to 65% $U_3O_8$. In addition to uranium, pitchblende contains from 16 to 21% silicon dioxide, from 5 to 6.5% lead oxide, from 0.25 to 0.5% ferric oxide, from 0.5 to 0.8% molybdenum oxide and relatively small amounts of a great many other oxides. In processing pitchblende ores, a solution of almost pure uranium is obtained by dissolving the ore in nitric acid and extracting the nitric acid solution obtained with an ether, e. g. diethyl ether, preferably in the presence of a salting-out agent such as calcium nitrate. However, the ether extracts mostly contain quite substantial quantities of nitric acid and of molybdenum, the latter in the form of the above-mentioned heteropoly molybdic acids. The nitric acid can be removed without any complication simply by sparging the ether solution with steam. It has been found rather difficult, though, to separate the complex molybdic acids from the ether solutions of the uranium without causing thereby too high a loss of uranium.

It is an object of this invention to separate molybdenum values from uranium values associated therewith in an ether solution whereby the molybdenum values are removed to a very high degree.

It is also an object of this invention to separate molybdenum values from uranium values associated therewith in an ether solution whereby the molybdenum is removed to a very high degree without a substantial removal of uranium, so that the loss of uranium is practically nil.

These and other objects are accomplished by contacting an ether solution containing uranyl nitrate and molybdenum values in the form of heteropoly molybdic acids with activated charcoal, and separating the charcoal containing said molybdenum values from the ether solution containing the uranyl nitrate.

All types of activated carbon are operative for the process of this invention, although some give better results than others. Especially satisfactory operation has been obtained with an activated charcoal sold under the name of "Darco G–60" by the Atlas Powder Company, Wilmington, Delaware.

The quantity of charcoal bringing about the best results, of course, is dependent on the concentration of the solution, the surface activity of the carbon and other conditions of operation. However, as a rule, from 8 to 12 grams of activated carbon per liter of ether solution has been found satisfactory.

It has been discovered that the molybdenum removal is improved quite considerably if the ether solution is allowed to age before the adsorption step. For instance, aging for about five weeks has given very good improvement of separation.

The nitric acid content of the ether solution to be treated also has a bearing on the quantity of molybdenum adsorption. It has been found that the less nitric acid there is present in the ether solution, the higher a degree of adsorption takes place. Even acid-deficient solutions, in which part of the free acid present as such or due to hydrolysis of salts is neutralized, yielded very satisfactory results.

The adsorption step is best carried out at room temperature and under stirring to warrant a thorough contact of the adsorbent with the ether solution. A series of experiments which were carried out under identical conditions, except that various stirring times were used for the contact, show that a contact time of about 45 minues is normally sufficient to obtain optimal adsorption.

After adsorption the charcoal may be separated from the treated ether solution by any means known to those skilled in the art, such as by filtration, centrifugation or decantation.

The activated charcoal does not have to be discarded after each use, but it can be regenerated. An aqueous solution of alkali metal hydroxide has been found well suitable for this purpose. For instance, sodium hydroxide solutions of from 0.1 to 6 N gave good results, but solutions in the range between 4.5 and 6 N have been found preferable. The higher concentrations are superior particularly when the molybdenum content of the adsorbent is relatively low. At higher molybdenum concentrations on the charcoal, especially at concentrations close to saturation, the weaker sodium hydroxide solutions have been found almost as effective as the more concentrated solutions. However, a sodium hydroxide of a concentration of 6 N always represented the optimal concentration in any case. A quantity of 125 ml. of 6 N sodium hydroxide has been found sufficient for the regeneration of 15 grams of activated charcoal, and a contact or stirring time of from 15 to 20 minutes has been found adequate. Of course, these data are not critical and may vary widely. After treatment with the alkali metal hydroxide solution the charcoal is then washed with water to remove adhering alkali metal hydroxide. An activated charcoal was used five times, each time after the regeneration just described, without there being noticeable any substantial impairment of the adsorptive capacity of the charcoal. The sodium hydroxide employed for the regeneration process was also found to be reusable for a great many regeneration cycles.

In the following, two examples are given to illustrate the process of this invention and its effectiveness without the invention to have the invention limited to the details given therein.

*Example I*

Disintegrated pitchblende ore was mixed with nitric acid, and calcium nitrate was added to the resultant solution, after filtration, which also contained an excess of nitric acid. This solution was contacted with diethyl ether; an ether extract phase was obtained which contained 150 parts of $MoO_3$ per million parts of uranium. This ether phase was then percolated through a 9-inch deep bed of "Darco" charcoal in a 2-inch diameter glass tube. The flow rate was 34 cc./min. and ether extract was run through the activated charcoal bed for 40 minutes. The $MoO_3$ content based on uranium content of the ether extract was reduced by this percolation to 15 p. p. m.

*Example II*

Twelve experiments were carried out by contacting 250 ml. of an ether solution each with 3 grams of various types of activated charcoal. While the ether solutions of uranyl nitrate, obtained by ether extraction of nitric acid solution from dissolution of pitchblende, for experiments 1–8 had a uranium content of 200 grams per liter, a molybdenum content of 1080 parts per million parts of uranium, and a content of excess nitric acid of 52 grams per liter, the ether solutions for experiments 9–12 contained 188 grams uranium per liter, 750 p. p. m. of molybdenum, and 38 grams of excess nitric acid per liter. The charcoal and ether solutions were stirred in each instance for 30 minutes by means of air-driven propellers in experiments 1–8 and for 45 minutes in experiments 9–12. The activated carbon was separated from the ether solution by filtration on a Buchner funnel. During stirring and filtration the ether evaporated, and this was then replaced by using a water-saturated ether. Each of the ether raffinates remaining after adsorption was analyzed for the molybdenum content. The charcoals used and the results obtained in these twelve experiments are compiled in the table below.

| Expt. No. | Type of Activated Charcoal | Parts Mo per million parts U remaining in ether |
|---|---|---|
| 1 | Darco G-60 | 22.5 |
| 2 | Clipfehar Airfloat | 290 |
| 3 | Columbia PW (200 Tyler screen mesh) | 209 |
| 4 | Columbia SP | 134 |
| 5 | Columbia L (20-80 Tyler screen mesh) | 300 |
| 6 | Binney to Smith Superlative | 502 |
| 7 | Binney to Smith 4X | 532 |
| 8 | Darco S-51 | 60 |
| 9 | Darco G-60 | 6.2 |
| 10 | Graff CMB-250 | 2.8 |
| 11 | Graff DMB-170 | 12.8 |
| 12 | Merck U. S. P. Activated | 25 |

It will be understood that this invention is not to be limited to the details given herein but that it may be modified wihin the scope of the appended claims.

What is claimed is:

1. A process of removing molybdenum heteropoly acids from an ether solution containing said acids together with uranyl nitrate comprising contacting said ether solution with activated charcoal, and separating said charcoal containing said molybdenum heteropoly acids from the ether solution containing said uranyl nitrate.

2. The process of claim 1 wherein the ether is diethyl ether.

3. The process of claim 1 wherein the ether solution also contains nitric acid.

4. The process of claim 1 wherein the charcoal containing said molybdenum acids is regenerated by contacting it with an aqueous alkali metal hydroxide solution followed by washing with water.

5. The process of claim 4 wherein the alkali metal hydroxide solution is a sodium hydroxide solution of a concentration ranging from 4.5 and 6 N.

6. The process of claim 5 wherein the sodium hydroxide concentration is about 6 N.

References Cited in the file of this patent

Kuhn: Chem. Abstract, vol. 44, page 5181 (1950).
Adam-Gironne: Bulletin de la Societe Chimique de France, vol. 20, pages 446 and 447 (1953).